United States Patent

[11] 3,613,840

[72] Inventor Roy Henry Touchstone
P. O. Box 2003, Jackson, Tenn. 38301
[21] Appl. No. 815,062
[22] Filed Apr. 10, 1969
[45] Patented Oct. 19, 1971

[54] QUICK SLACK ADJUSTER FOR LOCOMOTIVE BRAKES
5 Claims, 3 Drawing Figs.
[52] U.S. Cl. ........................................................ 188/197,
74/522, 188/56
[51] Int. Cl. ....................................................... F16d 65/44
[50] Field of Search .......................................... 188/56, 196
M, 197; 74/522

[56] References Cited
UNITED STATES PATENTS
2,122,975 7/1938 Christianson ................. 188/197
2,881,874 4/1959 Polanin ......................... 188/197

Primary Examiner—Duane A. Reger
Attorney—William S. Dorman

ABSTRACT: A brake adjustment device for locomotives wherein slack in the brake mechanism may be quickly and easily adjusted, and the brakeshoes may be quickly removed and replaced when they have become sufficiently worn, or are otherwise damaged or in need of repair. The adjustment device includes an apertured slide bar connected with a brake lever and extending through a trunnion carried by the pull rods whereby the brake may be quickly adjusted by pulling the slide bar through the trunnion and securing the bar in the proper position by inserting a keeper pin through the slide bar and trunnion. In addition, the slide bar device facilitates release of the brake lever to provide for a quick clearance between the brakeshoe and wheel, thus reducing the time required for the replacement of worn brakeshoes.

PATENTED OCT 19 1971

3,613,840

INVENTOR.
ROY H. TOUCHSTONE
BY
William S. Dorman
ATTORNEY

QUICK SLACK ADJUSTER FOR LOCOMOTIVE BRAKES

This invention relates to improvements in brake adjustment devices for locomotives and more particularly, but not by way of limitation, to a quick slack adjuster device for locomotive brakes.

Locomotives, and particularly diesel locomotives, are normally provided with friction-type brakeshoes engageable with the outer periphery of the locomotive wheels for slowing or braking the speed thereof. The brakeshoes wear relatively rapidly and it becomes necessary to adjust the slack due to the wear thereof in order to maintain an efficient braking operation. Screw-type slack adjusters are in widespread use today for adjusting the locomotive brakes. However, these devices are not only expensive but require a great amount of time for adjusting the slack in the brake system, and are particularly time consuming when it is necessary to replace worn brakeshoes. For example, it requires approximately 30 minutes to one hour to screw the adjustment device out and screw it back in. This is a great disadvantage, particularly when it is considered that it is usually necessary to renew brakeshoes approximately once a month. In addition, the screw-type adjustment devices require lubricating or greasing about once a month, which is an added expense and time-consuming matter.

The present invention contemplates a novel slide bar-type brake adjusting apparatus wherein all adjustment operations, whether in or out, may be completed in approximately four minutes time. The cost of the device is extremely low, and there is no necessity for lubricating or greasing, thus substantially eliminating any labor requirement for maintenance. One end of the slide bar is connected with a brake lever and the bar extends through a trunnion which is carried by the usual pull rods provided on the locomotive braking apparatus. As the brakeshoes become worn, or when it is necessary to adjust the engagement of the brakeshoes with the wheel for any reason, the slide bar may be quickly and easily pulled or pushed through the trunnion member, depending upon the type of adjustment required. The movement of the slide bar pivots the brake lever for repositioning the brakeshoe with respect to the outer periphery of the wheel. When the brakeshoe is properly adjusted, a keeper pin may be inserted through the trunnion and slide bar for securely retaining the slide bar in position and assuring an efficient holding of the brakeshoe in the adjusted position thereof. When it is necessary to change or replace the brakeshoe, the keeper pin may be removed from the trunnion member and slide bar and the bar may be quickly and easily pulled through the trunnion member for moving the brake lever sufficiently to pull the brakeshoe away from the wheel to a position wherein access to the brakeshoe is readily provided. Upon replacement of the brakeshoe, the slide bar may be pushed through the trunnion for moving the brake lever sufficiently for positioning the new brakeshoe in the desired position with respect to the outer periphery of the wheel. The keeper pin may be replaced in the trunnion and slice bar for efficiently retaining the brakeshoe in the braking position.

It is an important object of this invention to provide an adjustment device for locomotive brakes wherein the brakes may be quickly adjusted to assure an efficient braking operation.

Another object of this invention is to provide a slack adjuster device for locomotive brakes wherein maintenance of the device requires a minimum of time and expense for reducing the overall cost of maintenance of the brakes.

Still another object of this invention is to provide a slack adjuster device for locomotive brakes wherein the time required for changing a complete set of brakes is greatly reduced.

A further object of this invention is to provide a novel slack adjuster for locomotive brakes which is simple and efficient in operation and economical and durable in construction.

Other and further objects and advantageous features of the present invention will hereinafter more fully appear in connection with a detailed description of the drawings in which.

Figure 1:
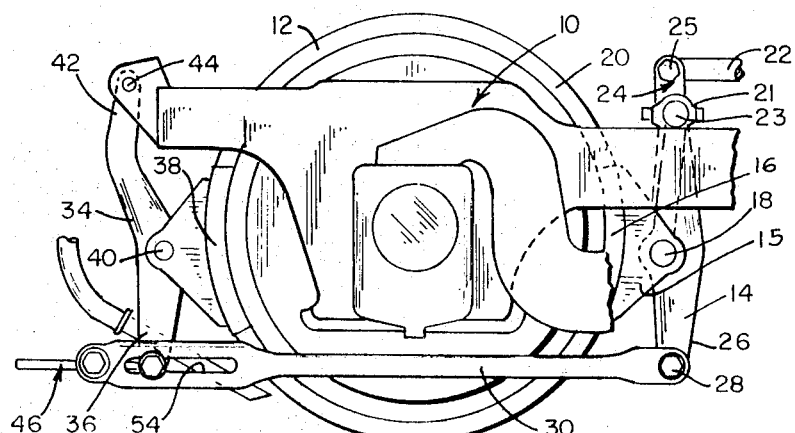
FIG. 1 is a side elevational view of a portion of one type of locomotive truck having a brake device thereon and provided with a slack adjuster embodying the invention.

Referring to the drawings in detail, reference character 10 generally indicates a truck body for a locomotive (not shown) and having a plurality of wheels 12 (only one of which is shown in the drawings) suitably journaled thereon as is well known. A first brake lever 14, commonly known as the live brake lever, has a first brakehead 15 and frictional-type brakeshoe 16 pivotally secured thereto intermediate the ends thereof as shown at 18 and is adapted for intermittent engagement with the cylindrical braking surface 20 of the wheel 12, as is well known. The live lever 14 is suitably connected with the usual piston rod 22 of the usual braking cylinder (not shown) normally provided on the locomotive truck 10 for actuation of the brakes. For example, one end 21 of the lever 14 may be pivotally connected at 23 to a bellcrank or lever arrangement generally indicated at 24, which in turn may be pivotally connected at 25 to the piston rod 22 in a manner whereby movement of the rod 22 in a direction toward the wheel 12 will pivot the lever 14 in a counterclockwise direction as viewed in Figure 1 for moving the brakeshoe 16 into a braking engagement with the wheel-braking surface 20. Simultaneously the opposite end 26 of the lever 14 will be pivoted in a direction away from the wheel 12. Conversely, when the piston rod 22 moves in a direction away from the wheel 22, the lever 14 will be actuated for moving the brakeshoe 16 away from or out of engagement with the braking surface 20, and will move the end 26 of the lever 14 in a direction toward the wheel 12.

The end 26 of the lever 14 is pivotally connected at 28 between a pair of spaced pull rods 20 and 32 and in the proximity of one end of the rods 30 and 32, as is well known. The rods 30 and 32 normally span the wheel 12 and extend in a left-hand direction, as viewed in FIG. 1, from the lever 14 to a position beyond the wheel 12. A second lever 34, commonly known as the dead lever, has one end 36 thereof pivotally and slidably secured between the rods 30 and 32 in a manner and for a purpose as will be hereinafter set forth. A second brakehead 37 and brakeshoe 38 generally similar to the brakehead 15 and brakeshoe 16 is pivotally secured to the lever 34 intermediate the ends thereof as shown at 40 and is adapted for intermittent engagement with the braking surface 20 substantially oppositely disposed from the brakeshoe 16, as is well known in this type of braking apparatus. The opposite end 42 is pivotally secured at 44 to a flange 46, or the like, rigidly secured to the truck 10. Thus, whereas the end 42 of the lever 34 is freely pivotal about the pivot 44, the end 42 is rigidly connected with the truck 10, as is well known. Of course, pivoting of the lever 34 in a counterclockwise direction about the pivot 44, as viewed in FIG. 1, will move the brakeshoe 38 into a braking engagement with the wheel-braking surface 20, and pivoting of the lever 34 in an opposite direction will disengage the brakeshoe 38 from the braking surface 20.

It is usually preferable that the lever 14 comprises a pair of substantially identical lever members disposed in spaced relationship with the brakeshoe 16 secured therebetween whereby an efficient braking force will be applied by the lever on the shoe during a braking operation. Of course, only one of the levers 14 is shown in Figure 1.

Figure 2:
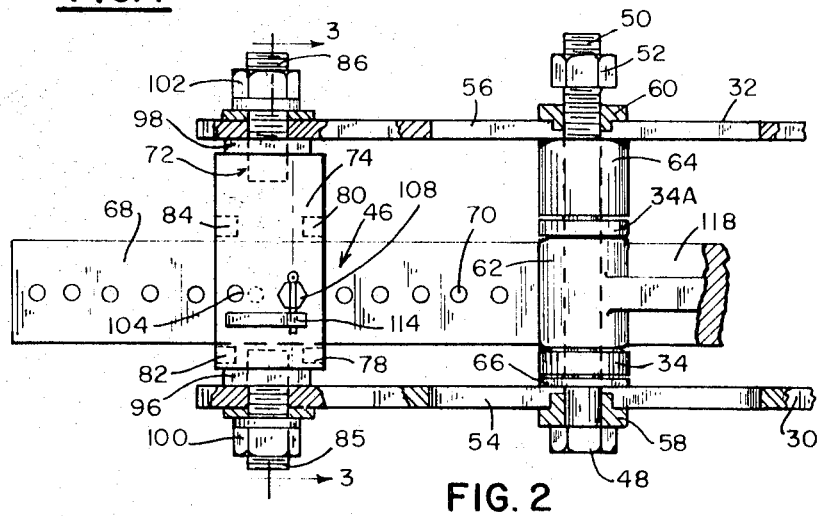
FIG. 2 is a plan view of a slack adjuster embodying the invention and secured to the pull rods of a brake apparatus.

Similarly, it is usually preferable that the lever 34 comprise a pair of substantially identical spaced lever members 34 and 34a as shown in FIG. 2 having the brakeshoe 38 secured therebetween. The ends 36 of the levers 34 and 34a are pivotally and slidably secured to the pull rods 30 and 32 by means of a slack adjuster apparatus generally indicated at 46 in a manner as follows:

The slack adjuster apparatus 46 comprises a first bolt or stud 48 having one end thereof threaded at 50 for receiving a nut 52 thereon. The bolt 48 extends transversely between the pull rods 30 and 32 and through a pair of aligned longitudinally extending slots 54 and 56 normally provided in the pull rods 30 and 32, respectively. The ends 36 of the levers 34 and 34a are interposed between the pull rods 30 and 32 in the proximity of the slots 54 and 56 and are apertured for receiving the stud 48 therethrough. Thus, the levers 34 and 34a are pivotally secured between the rods 30 and 32. A pair of oppositely disposed flanged guide sleeves 58 and 60 are disposed on the bolt 48 and ride in the slots 54 and 56, respectively, for guiding the sliding movement of the bolt 48 therein as will be hereinafter set forth.

A sleeve or cylindrical member 62 is disposed on the bolt 48 and is interposed between the spaced levers 34 and 34a as particularly shown in FIG. 2. In addition, a spacer sleeve 64 is disposed on the stud or bolt 48 between the lever 34a and the pull rod 32, and a spacer member 66 is disposed on the bolt 48 between the pull rod 30 and the lever 34. The nut 52 may be threaded onto the end 50 of the bolt 48 to secure the bolt 48 in position between the pull rods 30 and 32.

A slide bar 68 is welded or otherwise rigidly secured to the outer periphery of the sleeve 62 and extends radially outward therefrom in a direction away from the wheel 12. The bar 68 is preferably of a substantially flat elongated configuration and is provided with a plurality of longitudinally spaced apertures 70. The apertures are preferably spaced at intervals of approximately 1 inch, but not limited thereto. The slide bar 68 extends through a trunnion member generally indicated at 72 and is slidable with respect thereto for a purpose and in a manner as will be hereinafter set forth.

The trunnion 72 comprises a pair of spaced plate members 74 and 76 slidably receiving the bar 68 therebetween. The plates 74 and 76 are spaced apart by a first pair of spacer blocks 78 and 80 disposed on opposite sides of the bar 68 and a second pair of spacer blocks 82 and 84 disposed on opposite sides of the bar 68 in spaced relationship with respect to the blocks 78 and 80. The blocks 78, 80, 82 and 84 are preferably welded or otherwise rigidly secured between the plates 74 and 76 and maintain the spacing between the plate 74 and 76 slightly greater than the depth of the bar 68 for assuring an efficient sliding of the bar 68 therebetween. In addition, the blocks 78, 80, 82 and 84 provide a guide for the bar 68 during any sliding thereof with respect to the plates 74 and 76.

The trunnion 72 is further provided with a pair of substantially identical stud members 85 and 86 disposed between the plates 74 and 76 and extending in longitudinally opposite directions therefrom. The outer ends of the studs 85 and 86 are threaded at 88 and 90, respectively, and extend through aligned apertures 92 and 94 provided in the pull rods 30 and 32, respectively. Suitable spacer sleeves 96 and 98 are disposed on the studs 85 and 86, respectively, and are interposed between the plates 74 and 76 and the pull rods 30 and 32. In addition, suitable nuts 100 and 102 are secured on the threaded ends 88 and 90, respectively, for retaining the studs 85 and 86 in position. Upon assembly of the trunnion 72, the plates 74 and 76 may be inserted over the slide bar 68 and the studs 85 and 86 inserted through the respective apertures 92 and 94 and into position between the plates 74 and 76, and subsequently welded or otherwise rigidly secured between the plates.

Figure 3:
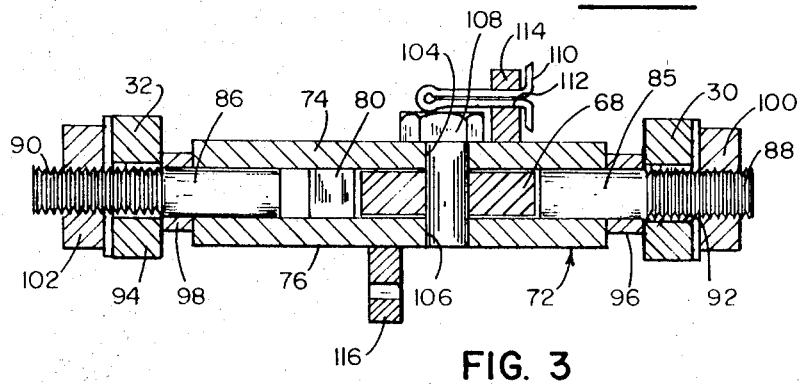
FIG. 3 is a sectional view taken on line 3—3 of FIG. 2.

The plate 74 is provided with at least two spaced apertures 104 in alignment with the plurality of apertures 70 provided in the slide bar 68. The apertures 104 are preferably 1½ inches apart, but not limited thereto. The plate 76 is similarly provided with at least two-spaced apertures 106 in alignment with the apertures 104. The slide bar 68 may be secured between the plates 74 and 76 in substantially any preselected position by positioning one of the apertures 70 in alignment between one set of the bores 104 and 106, and inserting a suitable keeper pin 108 therethrough. The keeper pin 108 may be removably retained in position by a cotter pin 110 which extends over the head of the pin 108 and through an aperture 112 provided in an outwardly extending flange 114 secured to the outer surface of the plate 74. A similar outwardly extending flange 116 is provided on the plate 76 whereby the pin 108 may be inserted through the plates 74 and 76 and bar 68 from an opposite direction than depicted in FIG. 3, if desired, and the cotter pin may be similarly utilized for retaining the keeper pin in position.

As shown in FIG. 2, a bracket member 118 is welded or otherwise secured to the outer periphery of the sleeve 62 and extends radially outward and downward therefrom in an opposite direction from the slide bar 68. The bracket 118 is provided with a plurality of apertures (not shown) whereby a suitable sand pipe (not shown) may be secured thereto for distributing sand to the vicinity of the track (not shown) and wheels, as is well known. This is particularly for use on all locomotive models having a sand pipe carried by the brake rigging. On other types of locomotives wherein the sand pipe is not utilized, the bracket member 118 may be completely eliminated, if desired.

In use, the stud 48 is adjusted in the slots 54 and 56 at the proper position with respect to the wheel 12, and particularly the friction surface 20 thereof, whereby the levers 34, 34a and 14 will be properly positioned to cause the brakeshoes 38 and 16 to efficiently engage the friction surface 20. This is accomplished by manually moving the slide bar 68 with respect to the trunnion 72 whereby the sleeve 62 transmits movement to the stud 48. When the stud 48 is at the preselected position, the bar 68 is positioned in the trunnion 72 with the aperture 70 in the closest proximity of a set of apertures 104 and 106 in alignment therewith for receiving the keeper pin 108 therethrough. Since the apertures 70 are at one inch spacing intervals, and the apertures 104 and 106 are at 1½ intervals, it is possible to provide adjustment positions of the slide bar 68 every one-half inch, which as a practical matter is sufficient for brake adjusting devices of this type.

When the piston rod 22 is actuated by the braking cylinder (not shown)

When the piston rod 22 is actuated by the braking cylinder (not shown) for applying the brakes, as is well known, the live lever 14 is pivoted in a direction for moving the shoe 16 against the braking surface 20, and simultaneously for pulling the pull rods 30 and 32 in a right-hand direction as viewed in FIG. 1. The trunnion 72 moves simultaneously with the pull rods 30 and 32, and the slide bar 68 secured thereto transmits simultaneous movement to the stud 48 and thence to the ends 36 of the brake levers 34 and 34a. This moves the ends 36 in a right-hand direction, as viewed in FIG. 1, and causes the brakeshoe 38 to engage the friction surface 20.

When the brakeshoes 16 and 38 become worn, or it is necessary to adjust the position thereof for any reason for increasing the braking efficiency, the keeper pin 108 may be removed for releasing the slide bar 68 from engagement with the trunnion 72. The slide bar 68 may then be quickly and easily manually moved in the proper direction for adjusting the position of the stud 48 within the slots 54 and 56 to provide the desired adjustment of the brake levers 34 and 34a. Of course, it will be apparent that adjustment of the position of the brake levers 34 and 34a will also effect the efficiency of the brake lever 14 in a corresponding manner. The slide bar 68 may again be secured to the trunnion in the manner as hereinbefore set forth for securing the stud 48 in the selected position within the slots 54 and 56.

Of course, when it is necessary to completely replace the brakeshoes 16 and 38, the keeper pin 108 may be removed from the bar 68 and trunnion 72 and the bar 68 may be pulled through the trunnion 72 in a left-hand direction as viewed in FIGS. 1 and 2 until the stud 48 is in the extreme left end of the slot 54. This pivots the levers 34 and 34a in a direction for moving the brakehead 37 away from the wheel 12 to provide sufficient clearance for removing and replacing the worn brakeshoe 38. It will be apparent that this also provides sufficient freedom of movement for the lever 14 to move the brakehead 15 away from the wheel 12 for removal and replacement of the shoe 16.

It is to be noted that the slack adjuster apparatus 46 may be installed on substantially any existing type locomotive brake rigging by simply removing the normal or presently existing screw-type adjuster and substituting the apparatus 46 therefor. The stud 48 is normally already present on the screw-type adjuster and the sleeve 62 may be easily disposed thereon as shown herein. The trunnion 72 may be substituted for the screw and nut portion of the screw-type adjuster and the slide bar 68 is inserted therethrough. As a practical matter, it has been found that the apparatus 46 may be utilized with approximately 80 percent to 90 percent of presently existing locomotive brake rigging with no alteration of the brake rigging itself.

From the foregoing it will be apparent that the present invention provides a novel slack adjuster for locomotive brakes wherein the brakes may be quickly and easily adjusted by manual reciprocation of a slide bar having one end in operable connection with a brake lever and having the opposite end extending through a trunnion member carried by the pull rods of the braking apparatus. The slide bar may be secured in the trunnion member by means of a keeper pin, which may be readily removed when it is desired to adjust the position of the bar. In addition, the brake lever is secured to the pull rods in a manner providing for quick disengagement of the brake lever when it is necessary to replace the brakeshoes for any reason. The novel slack adjuster apparatus may be installed on substantially any presently available locomotive braking apparatus with a minimum of alteration of the braking apparatus by merely removing the usual screw-type adjusting apparatus and installing the slack adjuster of the present invention in lieu thereof. The novel slack adjuster greatly reduces the time required for adjusting the brakes, and is particularly designed and constructed for reducing maintenance of the adjusting apparatus to a minimum.

Whereas the present invention has been described in particular relation to the drawings attached thereto, it should be understood that other and further modifications, apart from those shown or suggested herein, may be made within the spirit and scope of this invention.

What is claimed is:

1. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first mentioned means and extending slidably through the trunnion means, and means cooperating between the slide bar means and trunnion means for securing the slide bar means at substantially any desired position with respect to the trunnion means for securing the brake lever in substantially any desired position with respect to the pull rods.

2. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first-mentioned means and extending slidably through the trunnion means, and means cooperating between the slide bar means and trunnion means for securing the slide bar means at substantially any desired position with respect to the trunnion means for securing the brake lever in substantially any desired position with respect to the pull rods, and said slide bar means comprises a sleeve carried by the first mentioned means, a substantially flat elongated bar member carried by the sleeve and slidably extending through the trunning means, a plurality of spaced apertures provided on the bar member for facilitating the securing of said slide bar means at substantially any desired position with respect to the trunnion.

3. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first-mentioned means and extending slidably through the trunnion means, and means cooperating between the slide bar means and trunnion means for securing the slide bar means at substantially any desired position with respect to the trunnion means for securing the brake lever in substantially any desired position with respect to the pull rods, and said trunnion means comprises a pair of spaced plate members for receiving the slide bar means therebetween, spacer means secured between the plate members for retaining the plates in said spaced relationship and providing a guide for the slide bars means, stud means secured to the plates and extending outwardly therefrom and through the pull rods, and means secured to the stud means for retaining the stud means in position on the pull rods.

4. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first-mentioned means and extending slidably through the trunnion means, and means cooperating between the slide bar means and trunnion means for securing the slide bar means at substantially any desired position with respect to the trunnion means for securing the brake lever in substantially any desired position with respect to the pull rods, and wherein the first-mentioned means comprises a stud member extending transversely between the pull rods and having at least one brake lever journaled thereon, guide means carried by the pull rods and slidably engageable therewith for slidably securing the stud to the pull rods, said slide bar means comprises a sleeve member carried by the stud member, a substantially flat elongated bar secured to the outer periphery of the sleeve and extending slidably through the trunnion, said trunnion means comprises a pair of spaced plate members for receiving the elongated bar therebetween, spacer means secured between the plate members to provide said spacing therebetween and for providing a guide passageway for the elongated bar, oppositely disposed stud members secured to the plate members and extending in opposite directions therefrom and through the pull rods, means securing the oppositely disposed stud members to the pull rods, said slide bar securing means comprising a keeper pin, said elongated bar being provided with a plurality of spaced apertures, said trunnion plate members being provided with a plurality of spaced and aligned apertures whereby at least one aperture of the elongated bar may be aligned with at least one set of aligned plate apertures for receiving the keeper pin therethrough to lock the slide bar to the trunnion, and cotter pin means removably secured to the plate means for removably retaining the keeper pin in position.

5. In combination with a locomotive brake apparatus having brake levers and pull rods, a slack adjuster device as set forth in claim 3 wherein the plate members are provided with a plurality of spaced and aligned apertures, keeper pin means removably disposed through said apertures and said slide bar means for retaining said slide bar means in said position with respect to the trunnion.